INVENTOR.
Alda V. Bedford
BY
[signature]
ATTORNEY

June 24, 1958 A. V. BEDFORD 2,840,634

COLOR TELEVISION

Filed May 7, 1954 3 Sheets-Sheet 2

INVENTOR.
Alda V. Bedford
BY
[signature]
ATTORNEY

June 24, 1958 A. V. BEDFORD 2,840,634

COLOR TELEVISION

Filed May 7, 1954 3 Sheets-Sheet 3

INVENTOR.
Alda V. Bedford
BY
[signature]
ATTORNEY

United States Patent Office 2,840,634

Patented June 24, 1958

2,840,634

COLOR TELEVISION

Alda V. Bedford, Princeton, N. J., assignor to Radio Corporation of America, a corporation of Delaware Application May 7, 1954, Serial No. 428,240

3 Claims. (Cl. 178—5.4)

The present invention relates to color television receiver systems and in particular to simplified yet improved means for utilizing the present color television signal for color image reproduction in a color television receiver.

Color television is the reproduction on the viewing screen of a receiver of not only the relative luminescence or brightness but also the color hues and saturations of the details in the original scene. Color images may be transferred electrically by analyzing the light from an object into not only the image elements as is accomplished by the normal scanning procedure, but also by analyzing the light from elemental areas or images into selected primary or component colors and thereby deriving therefrom a signal representative of each of the selected component colors.

In order to utilize the existing radio frequency spectrum more advantageously, the Federal Communications Commission on December 17, 1953, adopted a set of color television standards which include provisions for the transmission of color information. These standards are explained and the principles to be used in generating and using signals according to the standards are given in the Federal Communications Commission Docket No. 10,637 released as FCC Public Notice No. 53-1663, Mimeo 98,948.

Before turning to the objects and the description of the present invention, consider first some of the more salient features of this color television signal. In this system, the transmission of a brightness signal is substantially that conventionally employed for a black and white television transmission. In addition, a color subcarrier wave, spaced from the main carrier wave by a frequency substantially equal to that of an odd multiple of ½ the line scanning frequency, is employed to carry the chromaticity information.

Consider first the nature of the brightness information. If the signal produced by a color television system is to provide service to black and white receivers, it is necessary that the system be compatible; this can be accomplished by utilizing the component color images of proper intensity in such a manner as to produce what would appear to an average observer as white light.

The three primaries recommended as standards in color television, namely, red, green and blue, do not appear equally bright. If the three primaries are mixed together to produce a white matching typical daylight it is found that the green primary, which is located at the center of the visible spectrum, accounts for 59% of the brightness while the blue and red primaries account for only 11% and 30% respectively. From the preceding discussion, the conclusion may therefore be drawn that it is possible to make a color television system compatible in the sense of providing service to black and white receivers by cross-mixing the red, green, and blue primary signals to produce a monochrome signal according to the relationship $$Y=0.30\,R+0.59\,G+0.11\,B \qquad (1)$$

Consider now the nature of the color information to be included in the color subcarrier wave. Since the luminance or brightness information is already included in the color television signal to the extent indicated by Equation 1, it is not necessary to send the color signal itself but rather a color difference signal which can indicate the deviation from the color information already present in the brightness signal Y. It is, therefore, useful to adopt a system of colors known as color difference signals which include red, green and blue color difference signals, that is, R—Y, G—Y and B—Y. It can be shown that these color difference signals can be constructed of different portions of red, green, and blue signals according to the following relationships:

$$R-Y=0.70\,R-0.59\,G-0.11\,B \qquad (2)$$

$$G-Y=-0.30\,R+0.41\,G-0.11\,B \qquad (3)$$

$$B-Y=-0.30\,R-0.59\,G+0.89\,B \qquad (4)$$

Since no one of the three component colors can be considered as independent of the other two and the Y signal, it is not necessary to transmit three signals representative of color difference signal information; rather, only two signals need be transmitted with the third signal recovered by proper recombination of the two signals at the receiver. If the R—Y signal and the B—Y signal are transmitted, the G—Y signal may be reconstructed according to the following relationship:

$$G-Y=0.51\,(R-Y)-0.19\,(B-Y) \qquad (5)$$

The color difference signals as described by Equations 2, 3, and 4, actually are not directly used in the color television signal for transmission to the receiver because they do not adequately account for the bandwidth provided for transmission of the color information and for the acuity of the eye. The color subcarrier is transmitted at a frequency of approximately 3.6 mc., and the upper edge of the picture transmission band has higher frequencies up to approximately 4.2 mc. If side band information is to be included with the color subcarrier in the region above the color subcarrier frequency, only components having modulating frequencies up to the range of 0.6 mc. can be accommodated using the double side band form of transmission. In the region below the color subcarrier, approximately 1½ mc. of side band information region is available before cross talk with the luminance information becomes objectionable in the color transmission. It is therefore desirable, as has been authorized by the Federal Communications Commission, to include in the color subcarrier two color difference signals having the following characteristics: One is a narrow bandwidth color difference signal which is transmitted double side band in the color subcarrier and has a total double band width restricted to approximately 1.2 mc. The second color difference signal is a wide bandwidth signal suitable for describing color edge definition which can be utilized in the transmission band by transmitting it in the color subcarrier double side band for modulating frequencies up to ½ mc. and single side band for modulating frequencies from ½ mc. to approximately 1½ mc.

Numerous experiments have indicated that an optimum choice of the above mentioned color difference signals for modulating the color subcarrier include a green-purple axis for the narrow bandwidth signal and an orange-cyan axis for the wide bandwidth chrominance signal; the orange-cyan axis signal is well known as yielding color variations of the type for which the eye has maximum acuity in addition to suitable color representation for such important items in a transmitted color item as flesh tones, reds, and pastels. The wide bandwidth and the narrow bandwidth signals are designated as the I signal and the Q signal, respectively, and can be formed in terms of R—Y and B—Y signals according to the following relationships:

$$I=0.74\ (R-Y)\ -0.27\ (B-Y) \quad (6)$$
$$Q=0.48\ (R-Y)\ +0.41\ (B-Y) \quad (7)$$

The I and Q signals are each modulated upon a component subcarrier of the same frequency with the phase of the two subcarriers being 90° apart. The two component color subcarriers are then fed into a common transmission channel in which they are added together to form a single color carrier. At the receiving end, the two independent components, namely the I and Q signals, can be separated and recovered by the synchronous detectors or demodulators in each of which the modulated subcarrier is heterodyned with a locally produced signal of proper phase. Each of the synchronous detectors yields either the I or Q signal depending upon the phase of the locally produced signal.

In order that the locally produced signal source in a color television receiver is accurately phased with the transmitter so that the processes of synchronous detection can be utilized, it is necessary to transmit a color information synchronizing signal. This synchronizing signal takes the form of a burst of approximately 8 cycles of the color subcarrier frequency located on the back porch of the horizontal synchronizing burst. In the color subcarrier, the phase of the color synchronizing burst leads the I signal phase by 57°, the phase of the I signal leading the Q signal by 90°.

The color subcarrier actually contains not only the I and Q information but also the R—Y, the G—Y and B—Y information, the recovery of each depending upon the precise phase at which the color subcarrier is heterodyned. In many modern color television receivers, it is convenient to employ the synchronous detection of the I and Q signals which may then be recombined to form the color difference signals according to the relationship given by Equations 2, 3, and 4. However, in another form of the modern color television receiver circuit, the color modulated subcarrier is subjected to synchronous detection in a manner whereby the color difference signals are recovered directly, with these color difference signals subjected to filtering and then combined with the brightness information and applied to the color image reproducer.

The present invention utilizes the benefits of both the I and Q system of color image receiver circuitry and the color difference type of receiver circuitry to form a novel and unique method for the utilization of the transmitted color television signal for yielding the color image on the color image reproducer.

It is, therefore, an object of the present invention to construct a color television image utilizing a luminance signal, narrow band one-color information and wide band two-color information.

It is another object of this invention to form a color television image by adding to a narrow-band single-color image, wide-band two-color information.

It is yet another object of the invention to provide an improved three-color television receiver, wherein a two-color quality of reproduction can be obtained at picture edges and whereby in large areas the reproduction is of ideal three-color quality.

It is yet another object of this invention to utilize for reproduction of the color television picture in a color television receiver, a primary color image for which the eye has moderately high acuity and which has been reproduced from both a very wide bandwidth channel and a narrow bandwidth channel and to which has been added two-color information along a color axis for which the eye has higher acuity, this higher acuity information having been transmitted through a wide band transmission channel.

According to this invention the transmitted color television image is reconstructed utilizing a luminous signal and narrow-band low acuity single color information to which is added wide-band two-color axis information; in this way the picture is permitted to degrade to an optimum two-color picture reproduction where three-color picture reproduction is not available.

In one form of the invention, the recovered G—Y signal is added to the wide-band luminance information and utilized to produce a green image on the face of the image reproducer. This green image is sharp because the luminance signal is mostly applied to the green channel even though only the narrow band Q channel carries the G—Y signal. The eye has high acuity for the brightness content of the green image but has relatively low acuity for changes in G—Y not accompanied by changes in brightness. At the same time the wide band I signal which contains principally orange-cyan information is demodulated and combined with suitable portions of G—Y signal to produce an R—Y and G—Y information. The R—Y and B—Y information is then added to the luminance information and used to provide high definition red and blue information on the color image reproducer.

The R—Y and B—Y signals cause changes along the axis from orange to cyan for which the eye has higher acuity than for changes along the axis from green to purple with fixed brightness.

Other and incidental objects of this invention will become apparent from a reading of the following specification and inspection of the following drawings in which.

Figure 1:
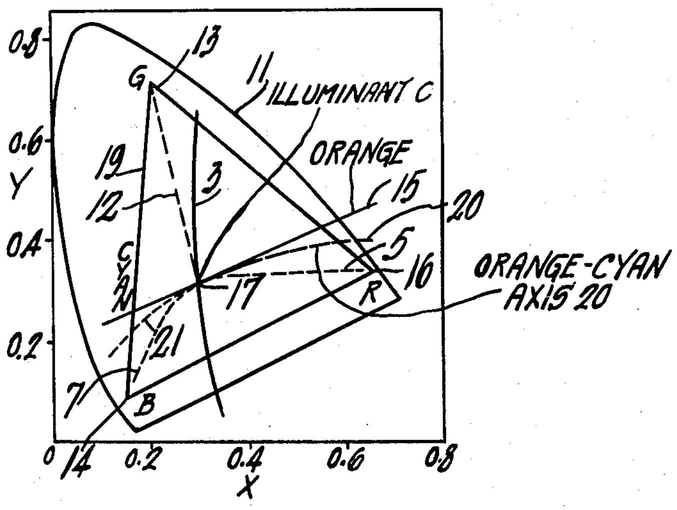
Figure 1 shows a chromaticity diagram.

Before turning to the present invention, consider first the CIE chromaticity diagram shown in Figure 1, such a diagram is explained in detail, for example, in the paper by D. W. Epstein entitled "Colorimetric Analysis of RCA Color Television System," as published in the June 1953 issue of the RCA Review. This diagram shows the locus of the visible spectrum indicating the colors of all spectral lines, and plots as an inverted horseshoe curve 11 with its open end closed by non-spectral purples. White is shown as illuminant C17 which is that point which evokes a colorless sensation. The hue of a color is related to its dominate wave length; after selecting a standard white, the hue of any color can be explained by the direction of the point representing that color from the white point on the chromatic diagram. Similarly, the saturation sensation given by any color is related to its purity, which is represented by the distance along the radius from the white point to the point representing that color, as measured as a fraction of the total distance out to the spectrum locus along the same radius. Chrominance is fully given by just two numbers, either by X and Y, or by angle and fractional radius, and to give any additional number conveys no further chrominance information.

The triangle 19 shown in Figure 1 shows substantially the useful visible spectrum which can be utilized for color television. It has three apexes; the green 13, blue 14 and the red 16. Note the orange-cyan axis 15. This axis represents the variation of colors from cyan through white light to orange and is representative of that axis of color for which the eye has maximum acuity. In practice, when reproduced on a three color reproducer system rather than a two-color reproducer system, the axis actually takes the form of the dotted line 20.

Consider the green-white axis 12. This axis will be seen to be a vital part of the present invention but here it will serve to illustrate the change in saturation that is associated with a particular color. At the illuminant C17 the eye sees what is substantially white light. As the color changes from illuminant C17 to green 13, what actually changes is the amount of white light which dilutes the color green; near the white light point 17, there is very little green with the majority of the color sensation coming from the white; at point 17 the saturation is said to be zero. As the furtherest point green 13 is approached along the axis 12 on the color diagram, the amount of white dilution of the green color reduces until at green 13 a substantially pure green light is seen; that is, the color has become more and more saturated, up to 100 percent.

When consideration of the chrominance diagram shown in Figure 1 is made with regard to color television, another highly important aspect must be considered. Willmear-Wright in their paper "Color Sensitivity of the Fovea Centralis" in Nature for July 28, 1945, pointed out that any color in a small enough patch well centered in the field of vision, can be matched by mixing only two and not three primary colored lights on the orange-cyan axis. Additional tests were made by the present inventor and described in his paper "Mixed Highs in Color Television" in the Proceedings of the I. R. E. for September 1950. The results of these tests may be summarized as follows. The dominant wave length, purity, and luminance data should all be transmitted from homogeneous color patches subtending relatively large areas at the eye. Only purity, within reduced limits, and luminance information need be transmitted for quite small color details, and only luminance information need be transmitted for the finest detail. Also, the eye has much greater acuity for detail residing in variations in luminance than it has for variations residing in variations in hue or color. The present system of color televsion makes allowances for such properties of the eye since it supplies simultaneously the luminance information having the high bandwidth to supply the information for finest detail, the two-color I signal information which represents orange-cyan axis information of relatively high bandwidth to yield sharp color details, and full three-color information for homogeneous patches subtending relatively large angles at the eye.

If a signal reproducer is to utilize the I and Q system of signal transmission directly, then its reproducing circuits must reconstruct the three primary color signals using signals along a pair of two-color axes. These two color axes are the axes 20 in Figure 1 which supplies the orange-cyan information and the axes 3 in Figure 1 which yields green-purple information.

If the color television receiver is to function utilizing the three color difference signals directly, namely G—Y, B—Y, and R—Y then it must function with information provided by the green-white axis 12, the blue-white axis 7, and the red-white axis 5, respectively, as shown in Figure 1. The present invention serves to utilize the best characteristics of both systems since it utilizes the green-white axis 12 which will present the green picture to which will be added the high definition orange-cyan color information along the orange-cyan axis 15 or 20. This is tantamount to transmitting a single picture in a primary color and adding to this picture, two-color edge and large area information.

Figure 2:
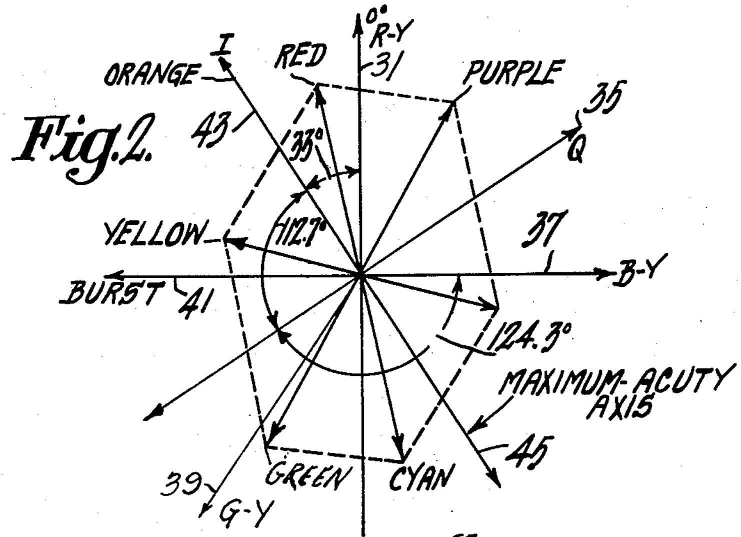
Figure 2 shows a vector diagram relating phase and color in a quadrature modulated color subcarrier.

The positions of the various colors as shown in Figure 1 with respect to the illuminant C17 indicate the nature of the color subcarrier signal in which the hue is a function of angle and the saturation is a function of distance from the center point. The actual representation which shows the angles involved is shown in Figure 2; this diagram is roughly comparable to the color circles used by primary school children, and, as has been mentioned, the phase angle gives a good indication of hue, while the subcarrier amplitude, when considered along with the corresponding luminance level, gives an indication of saturation. White or neutral colors show at the center of the diagram since these produce no subcarrier component and any given chrominance difference signal corresponds to axes or line on this vector diagram. As is shown in Figure 2 the R—Y axis 31 and the B—Y axis 37 are in quadrature, with the B—Y axis 37 180° out of phase with respect to the burst 41. The I axis 43 leads the R—Y axis 31 by 33° as shown with the Q axis 35 leading the B—Y axis 37 by 33°.

Though the subcarrier at the television transmitter is modulated by the I and Q signals, the resulting color subcarrier contains means for transmitting information for producing all of the hues which are useful in the reproduction of a color television picture. It is then necessary to operate a synchronous detector in conjunction with a local oscillator signal of corresponding phase in order to recover a particular primary or component hue from the color subcarrier. In the majority of the color reproducers which are used in color television receivers, it is customary to utilize as primary colors, red, green and blue.

In the present invention, it has been found desirable to utilize the best attributes of the color difference system and the I and Q system of colors. The G—Y signal is utilized to yield the green picture in combination with luminance signal. In addition the I signal is demodulated so as to yield the orange-cyan axes high-definition information which can be added to the information on the image reproducer already produced by the green signal. The color difference signals may be obtained from a combination of the G—Y signal and the I signal according to the following relationships:

$$G-Y=G-Y \quad (8)$$
$$2.445\ I+1.81\ (G-Y)=B-Y \quad (9)$$
$$1.141\ I-0.163\ (G-Y)=R-Y \quad (10)$$

Figure 4:
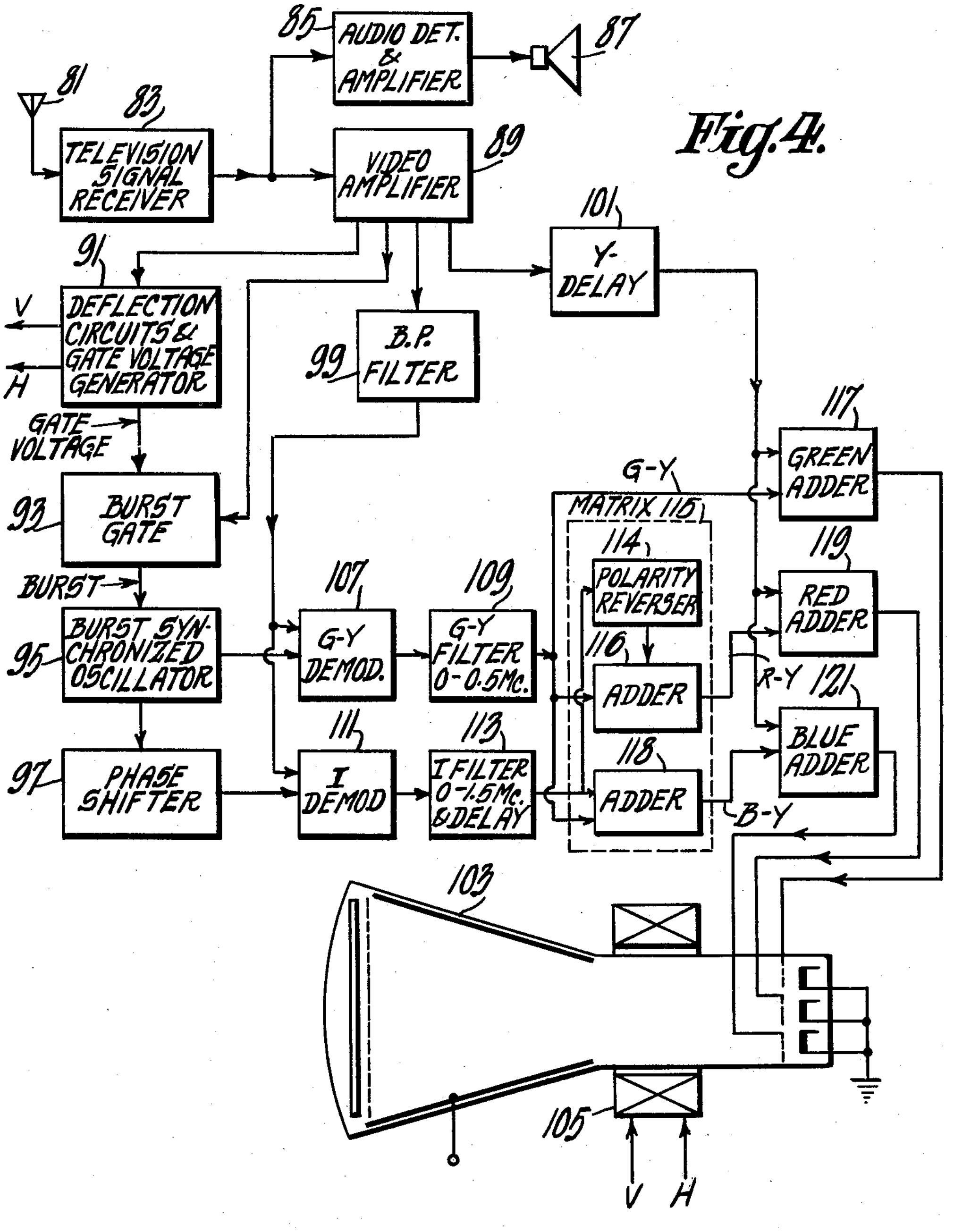
Figure 4 shows the block diagram of a color television receiver utilizing the present invention.

A television receiver circuit which utilizes the present invention is embodied in the circuit shown in Figure 4. Here the incoming television system arrives at the antenna 81 and is impressed on the television receiver signal 83 which yields the recovered television signal. The recovered television signal contains sound information; this sound formation may be recovered from the recovered television signal by use, for example, of the processes of intercarrier sound. Then, by use of the audio detector and amplifier 85 the sound signal is sent to the loud speaker 87.

The recovered color television signal is also applied to the video amplifier 89 whose output includes several branches. One branch passes to the deflection circuits and gate voltage generator 91 whose circuits provide deflection voltage for the deflection yokes 105, high voltage and a gate voltage which is applied to the burst gate 93 which opens the gate of an electrical gate circuit at precisely the time when the color synchronizing burst is present in the color television signal. If the color television signal is impressed on the burst gate 93, then upon opening of the burst gate 93 in a manner previously described, the burst is caused to enter the burst synchronized oscillator 95 which provides the signals which are used for synchronous detection of the color information from the color subcarrier.

There are many methods whereby the burst may be used to synchronize locally produced signals; one involves the use of ringing circuits, another involves the use of a reactance tube controlled oscillator, still another involvs the use of an injection locked local oscillator circuit. Any of these or other methods may be used with the specification that the output signal produced by the burst synchronizing oscillator be accurately synchronized with the master oscillator of the television transmitter.

The color television signal is also passed through the band pass filter 99 which has a pass band from approximately 2 to 4.1 mcs. thereby eliminating the luminance information outside of this pass band. The output of the pass band filter is then applied to the G—Y demodulator 107 and the I demodulator 111.

Figure 3:
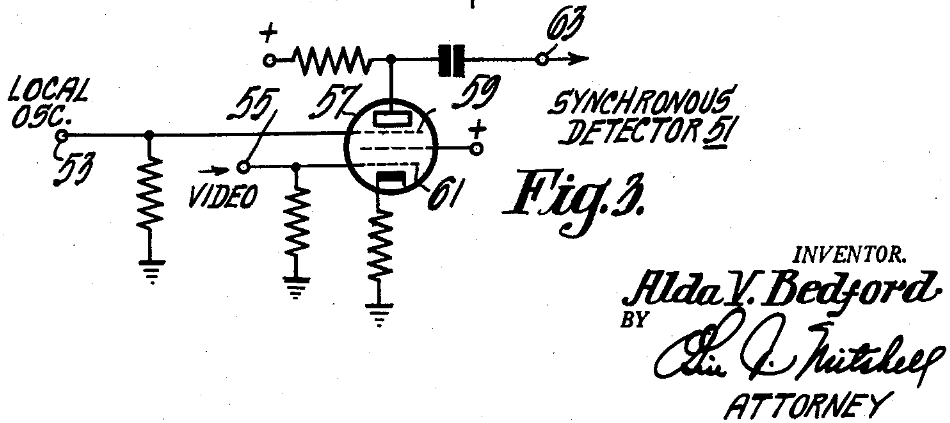
Figure 3 shows a typical synchronous detector circuit.

Each of the demodulators, denoted as the G—Y demodulator 107 and the I demodulator 11, operates in the same fashion. A typical demodulator or synchronous detector circuit 51 is shown in Figure 3 which shows a pentode 57 which is so connected that the video is applied to the control grid 61 and the burst synchronized local oscillator output is applied to the suppressor grid 59. By joint action of the control 61 and suppressor grid 59, multiplication or heterodyning of the video signal with the local oscillator signal takes place so that at the terminal 63 in the anode circuit of the pentode 57, the resulting components of the multiplication of the signals appear.

Returning now to the block diagram shown in Figure 4 the burst synchronizing oscillator 95 is caused to yield a locally generated signal having a phase corresponding to the G—Y component, this signal going to the G—Y modulator 107. By the use of the phase shifter 97, the I demodulator 111 is provided with a local oscillator signal whose phase is suitable for the demodulation of the I signal. The G—Y signal passes from the G—Y demodulator 107 through the G—Y filter 109 which has a pass band from aproximately 0 to ½ mc. The I signal passes from the I demodulator 111 to the I filter and delay circuit 113, the I fiter having a pass band of approximately 0 to 1.5 mcs.

The G—Y filter 109 yields a G—Y signal to the green adder 117. By proper combination of the outputs of the G—Y filter 109 and the I filter and delay circuit 113 in the matrix circuit 115 in accordance with the relationships given by Equations 8, 9 and 10. R—Y and B—Y signals are produced which are supplied to the red adder 119 and the blue adder 121 respectively. The R—Y and B—Y signals are formed, as considered more specifically, by passing the I signal through the polarity reverser 114 whose output is connected to the adder 116. By combining 1.141 I with −0.163 G—Y as specified by Equation 10, the R—Y signal is produced. By adding 2.445 I to 1.81 G—Y in the adder 118, as specified by Equation 9, a B—Y signal is produced.

The video amplifier also supplies a luminance signal through the delay line 101 to the green adder 117, the red adder 119 and the blue adder 121 respectively, in which adders the color difference signals are added to the luminance signals yielding the red, green and blue signals respectively. These red, green and blue signals are then furnished to the appropriate grids of the color kinescope 103.

It is interesting to note from Figure 4 that the G—Y circuit which includes the G—Y demodulator 107, the G—Y filter 109, and the green adder 117, in conjunction with the Y circuits, provides the green signal information directly to the color kinescope 103. The I information, as provided by the I demodulator 111 and the I filter and delay circuit 113, when combined with G—Y information in the inverter and matrix circuit 115, provides the red and blue information. This has the effect of adding flesh tones and corresponding hues in additon to high definition color edges to the already present green signal which is reproduced on the color reproducer.

In order to further demonstrate the simplicity of the circuits associated with the present invention, particularly in consideration of the relationships described in Equations 9 and 10, it follows that in order to accomplish the philosophy and the teaching of the present invention, adder and polarity reverser circuits are necessary so that proper amounts of I and G—Y information can be combined to form the B—Y and R—Y signals.

Figure 5:
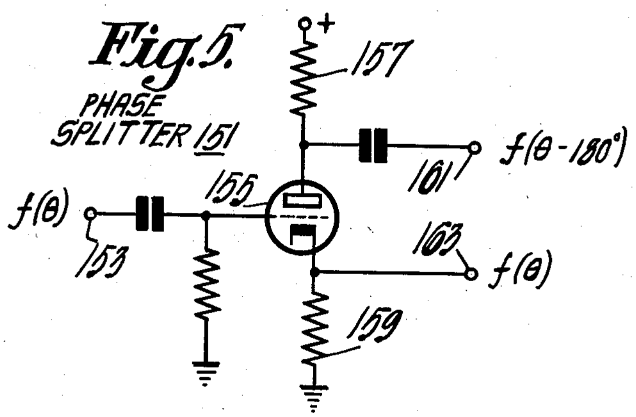
Figure 5 shows a typical phase splitter circuit.

Figure 5 shows a phase splitter 151 which can be utilized for producing simultaneously, a signal in one phase and the same signal reversed in phase or polarity. This is accomplished in one form as shown in Figure 5 by the expedient of applying the signal to be reversed in polarity to the control grid of the tube 155. The output signal appearing at the terminal 161 which is coupled to the anode output load 167, will be 180° out of phase with respect to the input signal. The signal obtained from the cathode resistor 159 will have the same phase as the signal impressed on the input grid terminal 153. This circuit demonstrates the ease with which the positive and negative signals described in connection with Equations 9 and 10 can be acquired; the precise amplitudes will be a function of the gain of the amplifier tube and the circuit parameters involved.

Once the signals have had their polarity reversed so that positive and negative versions of the signal are available for combination, then adder circuits must be used to provide the required signals.

Figure 6:
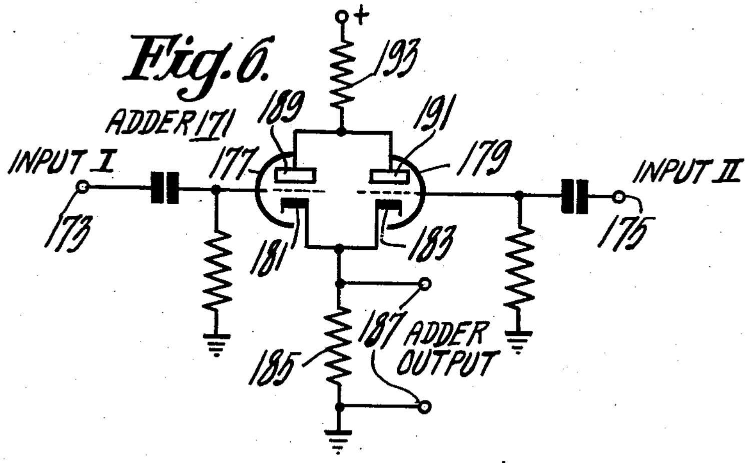
Figure 6 shows one type of adder circuit which can be used for adding two color signals together.

Figure 6 shows one such adder signal which performs the function of adding two signals together.

In the particular embodiment shown, a pair of triodes 177 and 179 are connected so that their anodes 189 and 191 respectively have a common plate load 193. The cathodes 181 and 183 of the triodes 177 and 179 respectively are also linked by a common junction and supplied with a common cathode resistor 185. If a first signal is applied to the input terminal 173 of the triode 177, and a second signal applied to the input terminal 175 of the triode 179, addition of the signals will take place, with the added signals appearing either across the cathode resistor 185 or across the load resistance 193.

The embodiment of the present invention as described in these specifications involve the addition of 3 signals; the G—Y signal, the I signal and the Y signal must be added to produce the blue and red signals according to the magnitudes represented by Equations 9 and 10.

Figure 7:
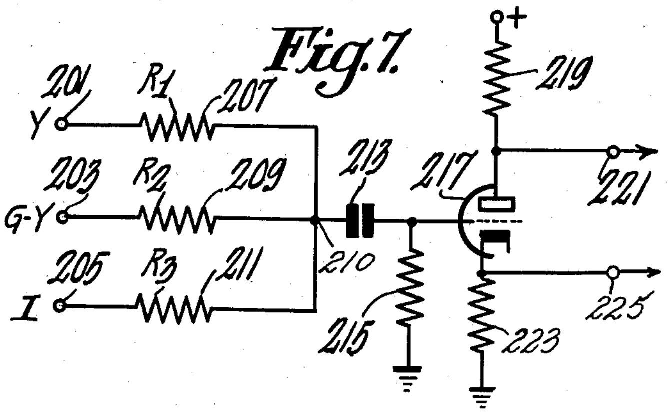
Figure 7 shows a type of adder circuit which is commonly used for adding three signals of the type found in color television receivers.

A method commonly used in color television receivers for adding together three signals of the type previously described in this paragraph is that shown in Figure 7 where three resistors are $R_1$, $R_2$, and $R_3$, as represented by the designators 207, 209 and 211, are connected to a common junction 210. The Y signal is applied to terminal 201 which is associated with resistor 207. The G—Y signal is applied to terminal 203 which is associated with resistor 209, and the I signal is applied to the terminal 205 which is associated with the resistor 211. The common junction 210 is then connected to the grid circuit of a vacuum tube such as the triode 217; in order for addition to take place, the resistances $R_1$, $R_2$, and $R_3$ must be of proper magnitude so as to give proper amounts of the Y, G—Y and I signals to the common terminal 210. The addition of the three applied signals produce the corresponding color signal which can then be obtained from either the output resistance 219, at the output terminal 221 in reversed polarity or from the cathode resistance 223, at the terminal 225 in the same polarity.

Having described the invention, what is claimed is:

1. In a color television receiver adapted to receive a color television signal representative of information relating to first, second and third primary colors indicative of a color image, said color television signal including a chrominance signal wherein a trio of different color difference information signals which correspond to said first, second and third colors respectively occur respectively at first, second and third phases, and also a fourth phase at which occurs a fourth color difference information signal corresponding to color information along an orange-cyan axis of information also relating to said color image, said first, second, third and fourth phases all related to a reference phase with said fourth phase lagging said reference phase by 57°, said color television signal also including color synchronizing burst having said reference phase; the combination of: first means responsive to said bursts to develop a first and second alternating current wave having respectively one of said first, second and third phases, and said fourth phase; first demodulating means responsive to said chrominance signal and coupled to said first means to be responsive to said second alternating current wave to demodulate said fourth color difference signal; second demodulating means responsive to said chrominance signal and coupled to said first means to be responsive to said first alternating current wave to demodulate the color difference signal occurring at the phase of said first alternating current wave in said chrominance signal; and means coupled to said first and second demodulating means and responsive to the color difference signals demodulated therein to develop color difference signals representative of the other two of said trio of color difference signals.

2. The invention as set forth in claim 1 and wherein said first, second and third primary colors are red, green and blue and wherein the phase of said first alternating current wave is the phase at which a green color difference signal occurs in said chrominance signal.

3. In combination: a first circuit to provide a chrominance signal wherein occur different color difference signal components at different phases relative to a reference phase; a second circuit to provide intermittent bursts of alternating current waves having said reference phase; first demodulating means coupled to said first and second circuits to demodulate color difference signal components occurring at a phase lagging said reference phase by 57° in said chrominance signal; second demodulating means coupled to said first and second circuits to demodulate color difference signal components occurring at a phase substantially different from said phase lagging said reference phase by 57° and different from phases lagging said last named phase by integral multiples of 90°; and means operatively connected to said first and second demodulating means and responsive to the components derived therein to produce signal combinations of said components and to therefrom develop a plurality of color difference signals corresponding to information occurring at phases of said chrominance signal different from the phases at which said components are demodulated in said first and second demodulating means.

References Cited in the file of this patent

UNITED STATES PATENTS

| | | |
|---|---|---|
| 2,697,744 | Richman | Dec. 21, 1954 |
| 2,734,940 | Loughlin | Feb. 14, 1956 |
| 2,743,310 | Schroeder | Apr. 24, 1956 |

OTHER REFERENCES

Color TV, Rider Pub., March 1954, pages 141, 142, copy in Division 16.

Introduction to Color TV, Admiral, February 1954, pages 17 to 27, copy in Division 16.

Electronics, February 1954, pages 136 to 143.